United States Patent
Vorm et al.

(10) Patent No.: US 12,422,414 B2
(45) Date of Patent: *Sep. 23, 2025

(54) CHROMATOGRAPHIC ANALYSIS WITH LOW PRESSURE DUAL GRADIENT REFOCUSING

(71) Applicant: EVOSEP APS, Odense C (DK)

(72) Inventors: Ole Vorm, Odense C (DK); Nicolai Bache, Odense C (DK)

(73) Assignee: Evosep ApS, Odense (DK)

( * ) Notice: Subject to any disclaimer, the term of this patent is extended or adjusted under 35 U.S.C. 154(b) by 696 days.

This patent is subject to a terminal disclaimer.

(21) Appl. No.: 16/337,769

(22) PCT Filed: Sep. 26, 2017

(86) PCT No.: PCT/DK2017/050309
§ 371 (c)(1),
(2) Date: Mar. 28, 2019

(87) PCT Pub. No.: WO2018/059639
PCT Pub. Date: Apr. 5, 2018

(65) Prior Publication Data
US 2020/0041467 A1    Feb. 6, 2020

(30) Foreign Application Priority Data

Sep. 28, 2016   (DK) .......................... PA 2016 70767

(51) Int. Cl.
*G01N 30/34*   (2006.01)
*B01D 15/16*   (2006.01)
(Continued)

(52) U.S. Cl.
CPC ........... *G01N 30/34* (2013.01); *B01D 15/166* (2013.01); *B01D 15/325* (2013.01); *B01J 20/287* (2013.01);
(Continued)

(58) Field of Classification Search
CPC ........ G01N 30/34; G01N 30/20; G01N 30/46; G01N 30/48; G01N 2030/207;
(Continued)

(56) References Cited

U.S. PATENT DOCUMENTS 4,204,952 A    5/1980   Snyder
5,057,437 A    10/1991  Binder
(Continued)

FOREIGN PATENT DOCUMENTS

CN    102961892 A    3/2013
EP    1265067 A1    12/2002
(Continued)

OTHER PUBLICATIONS

Dolan, LCGC North America, LCGC North America—Jul. 1, 2016, vol. 34, Issue 7 pp. 472-478.*
(Continued)

*Primary Examiner* — Krishnan S Menon
(74) *Attorney, Agent, or Firm* — Ruggiero McAllister & McMahon LLC

(57) ABSTRACT

There is provided a system for separation of analytes in a solution. The system encompasses a cartridge or trapping column enclosing a sorbent for binding the analytes in the solution and a conduit establishing a fluid link to a valve having a holding-loop to achieve elution through the cartridge at low pressures. Prior to entry into the loop, the eluent is diluted or modified by a confluent flow stream. The valve is switchable to a position following the elution from the cartridge for emptying the holding loop through an outlet port at high pressures comparable to those required for chromatographic columns. The system may use parallel gradient formation/elution to stagger analyses so that essen-
(Continued)

tially the only analytical phase that hinders a 100% duty cycle is the time required for moving the first analyte from the valve and to the detector.

20 Claims, 5 Drawing Sheets

(51) Int. Cl.
*B01D 15/32* (2006.01)
*B01J 20/287* (2006.01)
*G01N 30/20* (2006.01)
*G01N 30/46* (2006.01)

(52) U.S. Cl.
CPC .............. *G01N 30/20* (2013.01); *G01N 30/46* (2013.01); *G01N 2030/207* (2013.01)

(58) Field of Classification Search
CPC ......... G01N 30/7233; G01N 2030/085; G01N 30/08; G01N 2030/201; G01N 2030/202; G01N 30/22; G01N 30/32; B01D 15/166; B01D 15/325
See application file for complete search history.

(56) References Cited

U.S. PATENT DOCUMENTS

| | | | |
|---|---|---|---|
| 6,237,396 | B1 | 5/2001 | Durand et al. |
| 7,699,990 | B2 | 4/2010 | Deguchi et al. |
| 8,048,312 | B2 | 11/2011 | Deguchi et al. |
| 2004/0124128 | A1 | 7/2004 | Iwata |
| 2008/0156080 | A1 | 7/2008 | Balgley |
| 2009/0166525 | A1 | 7/2009 | Hughes |
| 2012/0262178 | A1* | 10/2012 | Dourdeville .......... G01R 33/307 324/321 |
| 2014/0014585 | A1* | 1/2014 | Dourdeville .......... G01N 30/82 210/656 |
| 2015/0177199 | A1 | 6/2015 | Borbely et al. |
| 2015/0198571 | A1 | 7/2015 | Vorm |
| 2016/0203965 | A1 | 7/2016 | Rorick et al. |
| 2016/0238573 | A1 | 8/2016 | Venkatramani et al. |
| 2017/0322187 | A1 | 11/2017 | Thielsch et al. |
| 2018/0052141 | A1* | 2/2018 | Stoll ..................... G01N 30/34 |
| 2019/0170706 | A1* | 6/2019 | Gilar ..................... G01N 30/34 |
| 2019/0250130 | A1* | 8/2019 | Vorm ..................... B01D 15/14 |
| 2020/0406165 | A1* | 12/2020 | Dlugasch ........... B01D 15/1878 |

FOREIGN PATENT DOCUMENTS

| | | |
|---|---|---|
| EP | 2818860 A1 | 12/2014 |
| JP | 11-271291 A | 10/1999 |
| JP | 2000-074898 A | 3/2000 |
| JP | 2015-206740 A | 11/2015 |
| WO | 2006/104905 A1 | 10/2006 |
| WO | 2007/092827 A2 | 8/2007 |
| WO | 2007/092827 A3 | 8/2007 |
| WO | 2009/098125 A1 | 8/2009 |
| WO | 2009/098125 A9 | 8/2009 |
| WO | 2011/129827 A1 | 10/2011 |

OTHER PUBLICATIONS

Hoerning et al. (2008). Isocratic solid phase extraction-liquid chromatography (SPE-LC) interfaced to high-performance tandem mass spectrometry for rapid protein identification. Journal of proteome research, 7(8), 3159-3167.).

Falkenby et al. (2014). Integrated Solid-Phase Extraction-Capillary Liquid Chromatography (speLC) Interfaced to ESI-MS/MS for Fast Characterization and Quantification of Protein and Proteomes. Journal of proteome research, 13(12), 6169-6175.).

Hoerning et al. (2007). Solid phase extraction-liquid chromatography (SPE-LC) interface for automated peptide separation and identification by tandem mass spectrometry. International Journal of Mass Spectrometry, 268(2), 147-157.).

Binai et al. (2014). Rapid Analyses of Proteomes and Interactomes Using an Integrated Solid-Phase Extraction—Liquid Chromatography—MS/MS System. Journal of proteome research, 14(2), 977-985.

International Search Report and Written Opinion from International Application No. PCT/DK2017/050309, mailed Nov. 23, 2017.

Bentayeb et al., "Determination of bile acides in human serum by on-line restricted access material-ultra high-performance liquid chromatography-mass spectrometry," Journal of Chromatography B, 2008, 869:1-8.

Songgang et al., "Screening of potential active anti-cancer components of Brucea javanica by SMMC-7721 and Hep-G2 comprehensive two dimentional CMC-monolith chromatography," Journal of Pharmaceutical Practice, 2014, 32(6) (4 pages).

Marino et al., "Characterization and usage of the EASY-spray technololgy as part of an online 2D SCX-RP ultra-high pressure system," Analyst, 2014, 139:6520-6528.

Supplementary European Search Report for EP Application No. 17855060 mailed Mar. 17, 2020 (3 pages).

Chinese Search Report for CN Application No. 201780070240.0 mailed Feb. 16, 2021 (2 pages).

Chinese Supplementary Search Report for CN Application No. 201780070240.0 mailed Sep. 17, 2021 (2 pages).

Chinese Search Report for CN Application No. 201780070240.0 mailed Apr. 19, 2022 (2 pages).

Modern Instrumental Analysis—3 pages.

Chemical Engineering & Equipment, 2016, pp. 188-191.

Dolan, LCGC North America, vol. 34, Issue 7, pp. 472-478, Jul. 1, 2016.

* cited by examiner

CHROMATOGRAPHIC ANALYSIS WITH LOW PRESSURE DUAL GRADIENT REFOCUSING

This application is a National Stage Application of International Application No. PCT/DK2017/050309, filed 26 Sep. 2017, which claims benefit of Serial No. PA 2016 70767, filed 28 Sep. 2016 in Denmark, and which applications are incorporated herein by reference. To the extent appropriate, a claim of priority is made to each of the above disclosed applications.

FIELD OF THE INVENTION

The present invention generally relates to the field of liquid chromatography and solid phase extraction prior to chromatographic analysis of samples and, more specifically, to the formation of mobile phase gradients and handling of the sample during such analysis.

BACKGROUND OF THE INVENTION

When analyzing chemicals and bio-molecules it is very common to separate mixtures of compounds into their individual species in order to simplify a subsequent detector response. That is, detector measurements on mixtures often yield results that cannot be interpreted whereas measurements on the constituents made separately can be readily interpreted. One of the most widely used techniques for separating mixtures of compounds into simpler mixtures is chromatographic separation. In chromatography, samples containing different chemical compounds are separated in time and space based on a difference in some physico-chemical property of each compound. As a simple example can be mentioned "size exclusion chromatography" where components are separated on the basis of differential molecular size. This is accomplished by passing a liquid (i.e. a mobile phase) that contains the sample mixture through a conduit that contains a chromatography material (i.e. a stationary phase). The chromatography material in this case is typically porous beads where large molecules are forced with the mobile phase on the short path around the beads whereas smaller molecules follow the mobile phase through increasingly narrow pores and therefore get delayed relative to the large molecules. The wanted effect in size exclusion chromatography is that the smallest compounds traverse a length of capillary pathway more slowly than large compounds and therefore are delivered at the exit end of the capillary pathway with a time delay that is inversely proportional to their size. Many other types of chromatographic separation exist, each taking advantage of a difference in the physic-chemical properties between different compounds. The liquid may be moved through a capillary pathway by pressure or electrostatic forces, or both.

Fractions of the sample may be analyzed by several methods, but mass spectrometry is a very frequently used method in connection with chromatography in general and it is almost invariably the method of choice for analysis of biomolecules such as proteins, peptides, and most metabolites following separation by liquid chromatography.

Both mass spectrometers and chromatography systems are relatively expensive instruments to deploy and maintain wherefore it is essential that they produce as much data per unit time as possible; i.e. LC-MS is a time critical process owing to the cost of the used equipment.

Usually chromatographic separation only produces usable data during a small time window of the entire analysis cycle. The data producing time relative to the overall cycle time is called the "duty cycle". Ideally, the duty cycle should be close to 100% in order to most efficiently utilise the chromatographic equipment as well as the detector. When analysing biomolecules, and in particular complex mixtures of biomolecules, such as proteomes, metabolomes and lipidomes, then the mass spectrometer is usually a high-performance model that is very expensive to install and maintain. Therefore, a high duty cycle of e.g. proteomics analyses is particularly desirable because of the financial benefit, but even disregarding price/analysis considerations, there is always a strong desire to obtain the highest amount of data in the shortest amount of time.

However, a more important consideration than cost is usually the consideration of the analytical sensitivity of LC-MS analysis because many analyses must be performed on limited material that yields a low signal response and would cause an analysis to entirely fail if the necessary sensitivity is not obtained. One of the most important means to optimize sensitivity in LC-MS is to downscale the chromatographic parameters of column diameter and flow-rate as explained herein. Over the recent twenty years, or so, the chromatography variant called "nano-flow" LC has become established for separation of proteins and peptides prior to MS analysis. This technique usually uses flow-rates between 200 nL/min and 400 nL/min and column diameters around 75 µm. This provides high analytical sensitivity, however, the low flow rates also mean that the cycle time for a nano-flow LC-MS analysis is high and simple household steps during which no data is recorded by the mass spectrometer take up a significant amount of time. These steps are predominantly the loading of the sample mixture onto the column and subsequent de-salting of the loaded sample with a pure solvent but also the time required for a mobile phase to move from the point where it is mixed and to the chromatographic column (a time called "dwell time") is a large contribution to the overall analysis time.

In order to retain the high analytical LC-MS sensitivity of nano-flow LC while significantly reducing the cycle time of the analysis, attempts have been made to build miniaturized solid phase extraction LC systems (SPELC) where pipette tips with immobilized sorbent are used as disposable chromatographic trapping columns on which samples can be loaded and de-salted prior to insertion into the SPELC system. Early reports on such systems include those of Knierman and Hale (ref. 1), as well as the two articles by Hoerning et al. (refs. 2 and 3). The advantages of current state of the art SPELC systems have been described by Falkenby et al. (ref. 4) and Binai et al. (ref. 5). This approach offers the advantage that the household steps of loading and de-salting samples are largely removed from the overall cycle time of the LC-MS analysis while small flow rates may still be used during the separation. Consequently the SPELC technology leads to significant time savings already and thus improves the duty cycle in itself but prior art systems still suffer from long dwell times, i.e. the delay that occurs when moving the mobile phase gradient from its mixing point to the stationary phase.

US2004124128 discloses a system for separating analytes of a liquid sample, the system comprising an inlet for introducing the sample into the system; a first column (30) having a sorbent for trapping the analytes, the first column being switchable between a trapping mode and an elution mode. US2004124128 does not teach a holding loop located between the first column and the chromatography column.

Departing from the above discussed prior art it is highly desirable to increase the chromatographic duty cycle with little or no negative effect on the chromatographic resolving power. Quite evidently there is a need for further improvement to the speed with which the mobile phase gradients can be delivered in order to elute the analytes through the chromatographic system.

SUMMARY OF THE INVENTION

The present invention improves the speed with which the mobile phase gradients can be delivered in order to elute the analytes through the chromatographic system. The present invention therefore contributes to increasing the chromatographic duty cycle. These speed gains may be obtained while simultaneously providing a positive effect on the chromatographic resolving power and while also performing the majority of fluid handling steps at low pressure such that only few steps involving elution through the separation column happen at high pressure.

The present inventors have found that the above mentioned challenges may be overcome by performing the majority of fluid handling steps at low pressure and only the final elution through the separation column happens at high pressure without compromising resolving power.

Accordingly, the present invention describes a novel means of generating mobile phase gradients for chromatographic separation of analytes in a manner where analytes are eluted from a first stationary phase upon which the gradient is modified such that each analyte species may bind to a next stationary phase until a later time point in the modified gradient where each analyte desorbs again in a smaller elution volume. The gradient formation and elution from the first stationary phase may happen at significantly higher flow-rates but significantly lower pressure than the flow-rate and pressure used for elution from the second stationary phase.

Further, the inventors have conceived the use of parallel gradient formation/elution to stagger analyses so that essentially the only analytical phase that hinders a 100% duty cycle is the time required for rinsing and re-equilibrating the separation column of the chromatography system.

These and other objects are accomplished by the present invention, wherein a system for separation of analytes in a liquid sample is provided, said system comprising:
  an inlet for introducing the sample into the system;
  a first column having a sorbent for trapping the analytes, said first column being switchable between a trapping mode and an elution mode, said trapping mode enabled when the inlet is in fluid communication with the first column, and said elution mode enabled when the analytes trapped in the first column are eluted;
  one, two, or more fluid pumps connected in parallel for delivering a mobile phase at a flow rate of 300 nL/min to 50 µL/min through said first column at a pressure of 1 bar to 50 bar, when the column is in elution mode,
  one, two or more, holding loops wherein the mobile phase gradient(s) and the partly separated analytes eluted from the first column may be stored for further separation
  one, two, or more fluid pumps connected in parallel for delivering a make-up flow at a flow rate of 300 nL/min to 50 µL/min at a pressure of 1 bar to 50 bar, said make-up flow being introduced between the first column and the holding loops, and
  one or more valves switchable between a low pressure position and high pressure position, wherein said low pressure position establishes a fluid connection from the first column to a holding loop, whereas said high pressure position establishes a fluid connection with a high pressure fluid pump and a conduit leading to a chromatography column, where the gradient and analytes in said loop is forced therethrough at a flow rate of 20 nL/min to 20 µL/min and a pressure of 1 bar to 3,000 bar. Thus, when switching from the low to high pressure position the valve system disconnects the fluid connection of the loop to the low pressure position and ensures that the liquid included in the loop is integrated into a fluid passage which may be subjected to high pressure, e.g. necessary for the chromatographic separation.

Preferably the inner diameter of the first column is at least twice as large as the inner diameter of the chromatography column, which preferably contains C18 reversed phase material.

The sorbent of the first column is preferably selected from C18, C8, C4, hilic, SCX, SAX, cellulose, antibodies and derivatives thereof.

In a second aspect the present invention provides a system for separation of analytes in a liquid sample, said system comprising:
  a disposable cartridge enclosing a sorbent for binding the analytes from the liquid,
  a recipient socket for receiving the cartridge, and allowing a mobile phase to flow through the cartridge into the recipient socket, thereby eluting the analytes into the recipient socket;
  a conduit in fluid communication with the recipient socket, said conduit establishing a fluid link to a holding loop wherein the mobile phase gradient(s) and the partly separated analytes eluted from the cartridge may be stored for further separation;
  one, two, or more fluid pumps connected in parallel for delivering a mobile phase at a flow rate of 300 nL/min to 50 µL/min through said cartridge at a pressure of 1 bar to 50 bar,
  one, two, or more fluid pumps connected in parallel for delivering a make-up flow at a flow rate of 300 nL/min to 50 µL/min at a pressure of 1 bar to 50 bar, said make-up flow being introduced between the recipient socket and the holding loop, and
  one or more valves switchable between a low pressure position and high pressure position, wherein said low pressure position establishes a fluid connection from the cartridge to the holding loop, whereas said high pressure position establishes a fluid connection with a high pressure fluid pump and a second conduit leading to a chromatography column, where the gradient and analytes in said loop is forced therethrough at a flow rate of 20 nL/min to 20 µL/min and a pressure of 1 bar to 3,000 bar. Thus, when switching from the low to high pressure position the valve system disconnects the fluid connection of the loop to the low pressure position and ensures that the liquid included in the loop is integrated into a fluid passage which may be subjected to high pressure, e.g. necessary for the chromatographic separation.

Likewise the inner diameter of the cartridge is preferably at least twice as large as the inner diameter of the chromatography column.

In particularly preferred embodiments of the second aspect the cartridge is chosen among:
  a pipette tip with chromatographic resin embedded and fixated therein;

a length of tube, wherein its inner and/or outer surfaces may be cylindrical, conical, spherical or any combination thereof; and a planar disc.

Preferably the chromatographic column of the second aspect contains C18 reversed phase material. Similarly the sorbent of the cartridge is preferably selected from C18, C8, C4, hilic, SCX, SAX, cellulose, antibodies and derivatives thereof.

In a third aspect the present invention provides a method of operating a system according to the first or second aspect, wherein the flow through the first column or cartridge and the make-up flow are each below 10 mL/min while the flow through the chromatography column during separation is below 5 mL/min. The gradient flows may be non-linear over time and computed based on the requirement that the resulting gradient eluted from the holding loop be a piecewise linear gradient.

Analytes may be eluted from the cartridge (or trap column) either by running an appropriate mobile phase gradient through the cartridge or by running an aliquot of eluent of an appropriate fixed composition trough the cartridge (an isocratic elution). Both in the case of isocratic elution and gradient elution, it is possible to modify the eluent after the cartridge by adding an additional fluid stream such that the total composition favors binding of analytes at the point of the separation column. Data have been obtained with multiple setups that all work as expected and where each setup has its particular advantages as described below (under details):

1. Isocratic first elution with isocratic dilution
2. Isocratic first elution with gradient flow dilution
3. Gradient first elution with isocratic dilution
4. Gradient first elution with gradient flow dilution It is highly counter-intuitive, yet surprisingly efficient, to run the eluent from a trapping column into a holding loop, especially with capillary and nano-flow chromatography as that step would normally cause excessive diffusion and turbulence that would lead to severe peak broadening. However, this step is done in order to clearly separate low-pressure operations from the one step that must use high pressure, namely forcing the mobile phase through the resistive separation column. It is of high value to perform as many steps as possible at low pressure. Advantages include:

Low pressure components are usually cheaper to manufacture or purchase (pumps, valves, tubing, fittings, sensors, etc.)

Leaks at sites of connections are much less of an issue than at high pressure which is also true for leaks around pump seals and valve rotors.

Low pressure components usually exhibit much less wear and need less maintenance, i.e. a low pressure system is significantly more robust. As a rule of thumb, lifetime of valve rotor seals is inversely correlated to the square of the fluid pressure. That means that if the chromatographic pressure in an operation can be reduced 100 times, the lifetime will increase 10,000 times.

Precise control of liquid flows, i.e. gradient mixing and flow rates is significantly simpler at low pressure where the difference in compressibility of the different mobile phases plays no role. For instance, a volume of water may be compressed by 3% at a pressure of 1,000 bar (15,000 psi) whereas acetonitrile is compressed by 15% at the same pressure. This means that differential compression and de-compression can have major unwanted effects in the chromatographic run. At low pressure, all solvents are virtually incompressible.

The principle of parking a gradient with partly separated analytes in a holding loop may only work for low-flow chromatography such as capillary flow and nano-flow chromatography. At least, only holding loops with a volume below 200 μL have been tested for the present invention. It was found that loops that were several meters long and around 100 μm in inner diameter allowed for very little diffusion during the storage period, and it was observed that gradients easily could be stored for an hour with no notable gradient diffusion.

The seeming lack of diffusion inside the holding loop also meant that it can be a significant advantage to use two holding loops in parallel in order to optimise the cycle time of staggered analyses.

Dilution of a mobile phase at a point downstream from a first stationary phase column with the objective of letting analytes re-adsorb more efficiently on a second stationary phase column has been reported on before (e.g. ref. 6). But the present invention differs from prior art systems in several ways, including: i) that the entire mobile gradient is offset such that essentially all analytes eluted from the first column are present within the modified mobile phase gradient at a gradient strength that favours re-adsorption; and ii) that the entire modified gradient and all analytes are stored temporarily in a holding loop in-between a first and a second stationary phase column; iii) that the mobile phase dilution happens in parallel with the elution from the first column, and before entry into the holding loop, by means of pumps acting in parallel; and iv) that the gradient formation, modification and elution from the first stationary phase column take place at low pressure while the actual chromatographic separation is accommodated by using one high pressure pump that forces the entire preformed, diluted gradient and the analytes through the second stationary phase column.

BRIEF DESCRIPTION OF THE DRAWINGS

The above, as well as other advantages of the present invention, will become readily apparent to those skilled in the art from the following when considered in the light of the accompanying drawings.

DETAILED DESCRIPTION OF THE INVENTION

The above, as well as other advantages of the present invention will become readily apparent to those skilled in the art from the following detailed description of preferred embodiments when considered in the light of the accompanying drawings. The present invention relates to the following aspects:

1. Low pressure gradient formation and low pressure elution through a first column (which may be an ordinary trapping column or a disposable sorbent cartridge) followed by low pressure gradient modification (dilution, mostly) before positioning into a holding loop, also at low pressure. Gradient with partly separated analytes are then flushed from loop under high pressure for further separation on separation column.
2. Algorithmic computation of pump flow required in the first binary gradient relative to the gradient modification flow in order to obtain a (piece-wise) linear resulting gradient in the holding loop.

Figure 1:
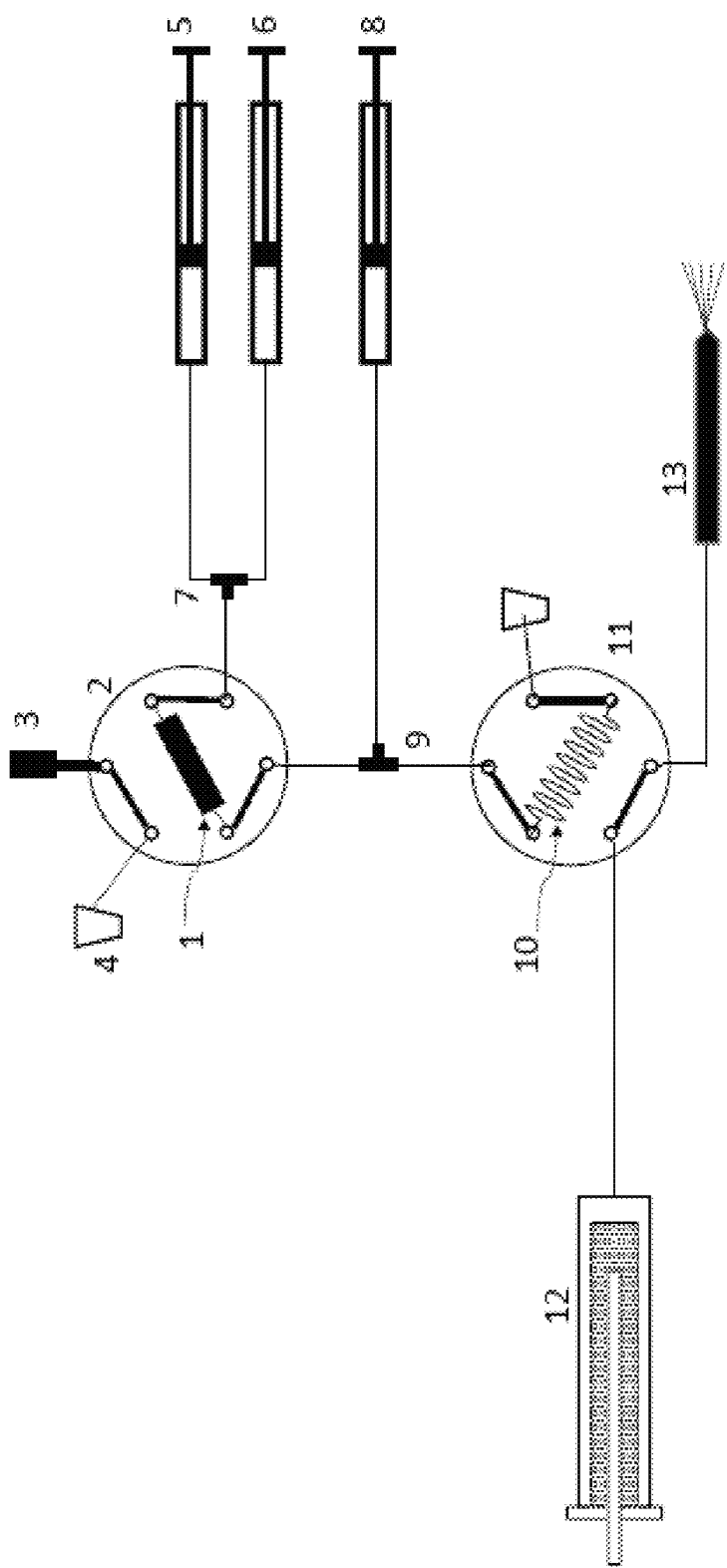
FIG. 1 shows a configuration enabling low-pressure gradient formation through a trap column (partial elution possible), post trap dilution of eluent, into storage loop, and a high pressure elution through an analytical column.

FIG. 1 shows the schematics of a simple implementation of the present invention as applied to normal reversed phase chromatography with a multi-use trapping column [1] positioned across a 6-port two-position valve [2] such that a sample may be loaded from an autosampler (not shown) into an injection port [3]; when the sample of analytes dissolved in liquid passes through the trapping column, analytes will be captured on the column while the solvent flows through the column to the waste port [4](the valve must be in the other position, i.e. the one not shown here). When the valve is switched (the depicted position), a mobile phase gradient from two low pressure pumps [5 &6] is formed at a mixing Tee [7] and the liquid moves through the trapping column and sequentially elutes all analytes as a result of the gradually increasing eluting strength of the mobile phase gradient. After the trapping column, a second fluid stream, from a third pump [8] is added at a second mixing Tee [9] upon which the now diluted gradient (containing the partly separated analytes) is placed in a holding loop [10] that is positioned across a second sheer valve [11]. All these liquid handling steps can occur at relatively low pressure, e.g. around 1 to 20 bar (although for some analyses it may be advantageous to use up to 50 bar) even if a high flow-rate of, say up to 50 µL/min is used. When the second sheer valve switches position, the low pressure fluidics components get disconnected while the holding loop is now in-line with a high pressure fluid source [12] on one side and a separation column [13] on the other side. The modified gradient is now forced by the high pressure pump out of the loop, through the separation column to a detector. At the column head, each analyte will bind to the stationary phase until a later point in time where the gradient has reached the same elution strength that eluted the analyte from the trapping column material (provided the stationary phase is equivalent in the two columns). As the low pressure components are disconnected, the elution may happen at any back pressure that the valve and pump can withstand. This same functionality may also be achieved by using 3 needle valves instead of one sheer valve. Needle valves can currently withstand up to 40,000 psi on a routine basis while such pressures may be delivered by e.g. pneumatic pumps. The present invention therefore also provides for a very powerful means of loading ultra-high pressure columns well above the pressure ranges currently provided by commercial systems.

As a concrete implementation example, the trapping column may contain C18 reverse phase chromatography material in a conduit that is e.g. 10 mm long and 300 µm inner diameter. A gradient flow that elutes the sample may be formed from water and acetonitrile at e.g. 20 µL/min while maintaining low back pressure. The added mobile phase at the second Tee may be water at an initial flow rate of 20 µL/min and dropping to zero at the end of the gradient; this approximately reduces the acetonitrile composition of the original gradient to around half initially while it ends at the same level as the original gradient. The holding loop may be a 7 m long piece of fused silica tubing with an inner diameter of 100 µm where the narrow diameter is chosen because it reduces diffusion of the gradient during the time it stays in the loop. The separation column may be a 20 cm long conduit with an inner diameter of 150 µm and containing C18 reversed phase material. Elution of the partly separated analytes and the gradient from the holding loop could for instance happen at a rate of 1 µL/min and the elution through the separation column would therefore take more than 20 times longer than the elution from the trap column.

Figure 2:
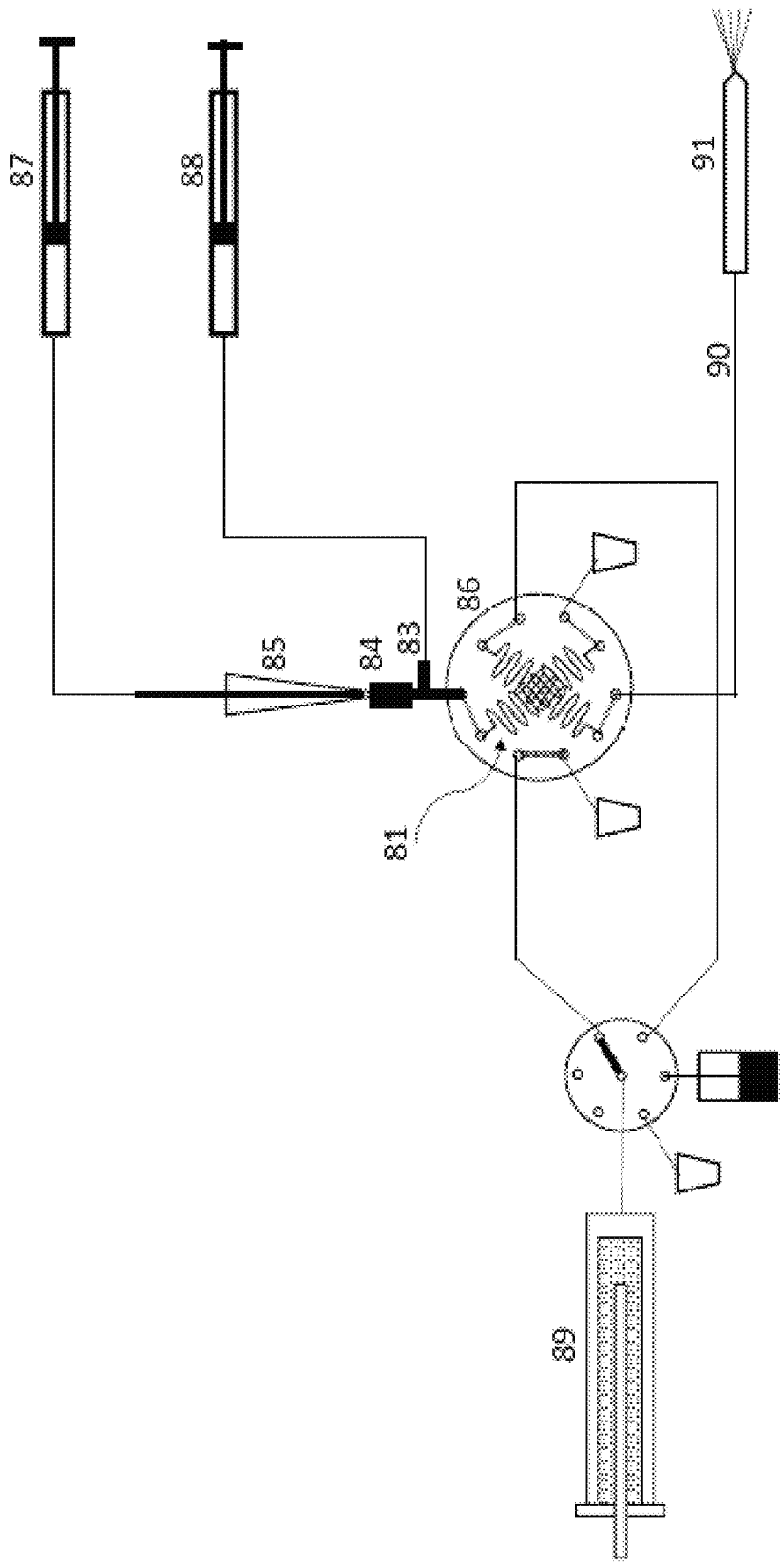
FIG. 2 shows isocratic elution through a disposable cartridge and subsequent gradient formation before entering storage loop.

FIG. 2 shows a setup also in accord with the present invention; in this setup an isocratic flow from a source [87] elutes peptides from a disposable sorbent cartridge [85] while a make-up fluid from another source [88] is added, again at a connection [83] just after the recipient socket [84]. Initially the flow rate of the make-up flow is high but it is gradually reduced such that the liquid composition within the holding loop [81] de-facto becomes the desired gradient. The analytes of all species will be in the most diluted fluid volume at the distal point of the holding loop (closest to the separation column [91]). Once the analytes and the gradient are in the holding loop, the valve [86] will switch and thereby place the loop in-line between a high-pressure liquid delivery source [89] (e.g. a syringe pump) on the one side, and a conduit [90] leading to a separation column [91] on the other side. As the gradient with analytes reaches the head of the separation column, all analyte species adsorbs to the stationary phase material (if the mobile phase has been sufficiently diluted) until such later point in the gradient where each analyte species is released and the thus focused species are propagating through the column towards the detector.

As shown, the selected high pressure valve is a 2-position 10-port valve which accommodates the use of two holding loops in parallel. This allows the next sample and gradient to be loaded into one holding loop while the previous sample and gradient is still being analysed. Since the low pressure steps (of eluting with a first gradient through the disposable sorbent cartridge and adding make-up fluid and positioning the resulting gradient in a holding loop) are so fast relative to most elutions through the separation column, then the effect of using two holding loops in parallel is that the next sample is already loaded and ready as soon as the previous sample is finished. Further, the gradient is positioned at the very end of the holding loop, meaning that the dwell time is exceedingly small and the net effect of pre-loading and small dwell time is that this system can have near 100% duty cycle.

Figure 3:
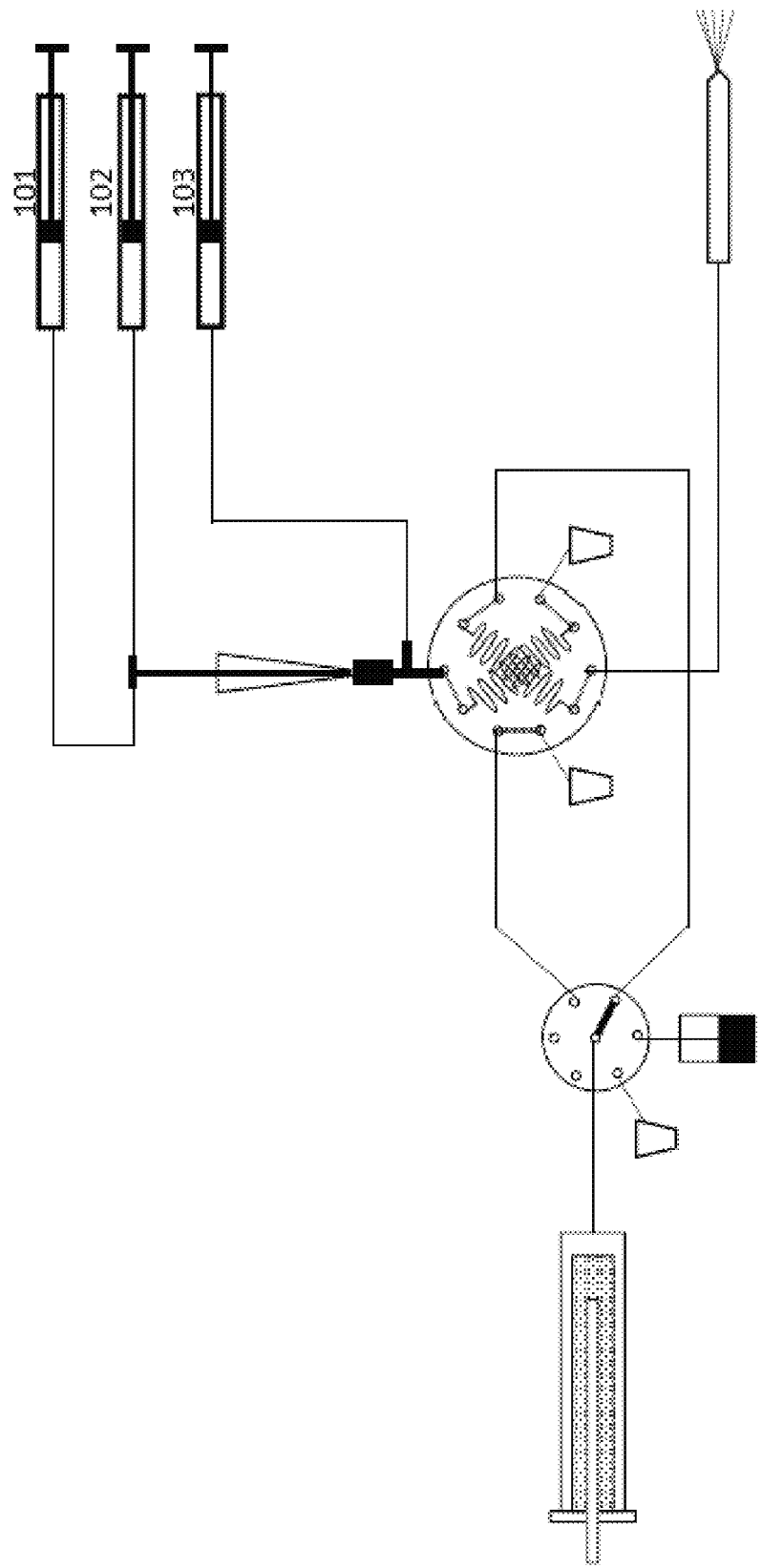
FIG. 3 shows low pressure gradient through cartridge and subsequent dilution before entering storage loop.

FIG. 3 shows a further implementation in accord with the present invention; in this setup two pumps [101 and 102] are used to deliver a gradient through the cartridge thereby eluting different analytes at different times of the gradient, all the while, an isocratic make-up fluid is again added from a third pump [103] downstream of the cartridge such that it modifies the gradient as it elutes from the cartridge. As an example, this could be a gradient that runs through a C18 sorbent containing cartridge and starts out at 2% organic phase in water and gradually increases to 40% organic phase (e.g. acetonitrile) while the make-up fluid may be pure water that initially is added at an equal flow rate as the gradient and where the flow rate is gradually reduced over the course of the gradient such that the gradient entering into the holding loop (and containing the semi-separated analytes) is now a gradient that runs from 1% to 35%. Following a valve switch, this gradient is then flowed through a C18 sorbent containing separation column but since each analyte species is present at a point that contains less organic solvent than the composition that eluted it from the C18 of the cartridge, then each analyte will bind temporarily onto the separation column until a little later in the gradient where they again would elute rapidly. The gradient modification from the make-up fluid is thus used to make each species re-sorb and focus onto the separation column.

While the setup in FIG. 3 has one more syringe pump than the setup in FIG. 2 and therefore is more complex, the setup in FIG. 3 is easier to optimise in terms of diluting the gradient such that analytes are re-focused across the entire chromatogram.

Figure 4:
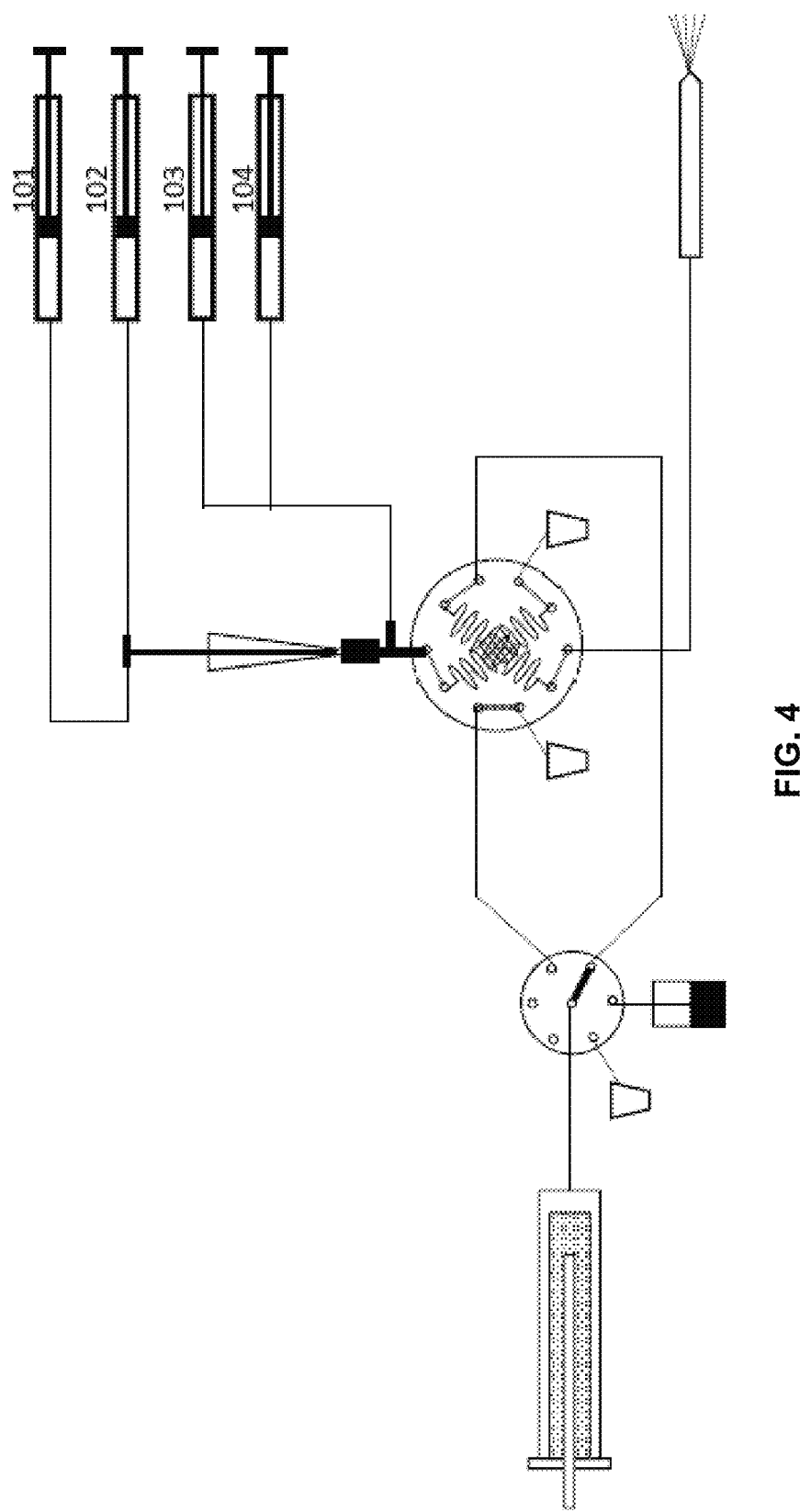
FIG. 4 shows Low pressure gradient through cartridge and subsequent gradient modification before entering into storage loop (or trapping column).

FIG. 4 shows a further modification also in accord with the present invention where two pumps [101 and 102] are used to deliver a gradient through the disposable sorbent cartridge thereby eluting different analytes at different times of the gradient, all the while, downstream of the cartridge, a make-up fluid is added from two pumps [103 and 104] such that the make up fluid may also be ramped as a gradient such that this make-up gradient modifies the original gradient that elutes from the cartridge. This provides a very high degree of flexibility to control the resulting gradient that enters into a holding loop (or runs through a trapping column as the case may be).

One advantage that is obtained from having two syringe pumps available for the make-up flow, is that the entire gradient including a separation column rinsing step with very high eluting strength can be formed and loaded into each holding loop. With the setup in FIG. 3, a rinsing step would require that the high eluting strength liquid be delivered by the high pressure pump whereas the setup in FIG. 4, can use any liquid, including water, in the high pressure pump in order to push the gradient through the separation column. In the schematic shown in FIG. 4, the liquid of the high pressure pump only has one function, namely to push the gradient out of the holding loop. This is easier to control than if the high pressure pump solvent also was used for rinsing steps.

Pump Control Aspects of the Present Invention

The mobile phase output of each of the 3 or 4 pumps involved in generating the first gradient and providing the make-up flow needs to be controlled and synchronized carefully. Difficulties in generating linear, binary gradients from three solvent flows arise from the fact that the volume between the two mixing points ($V_{tt}$) is always greater than zero. While a change in flow-rate from any of the solvents has an instantaneous effect on the collective output flow rate immediately downstream of the second mixing Tee, any changes in composition will be delayed owing to the volume between the first and second mixing Tees.

Figure 5:
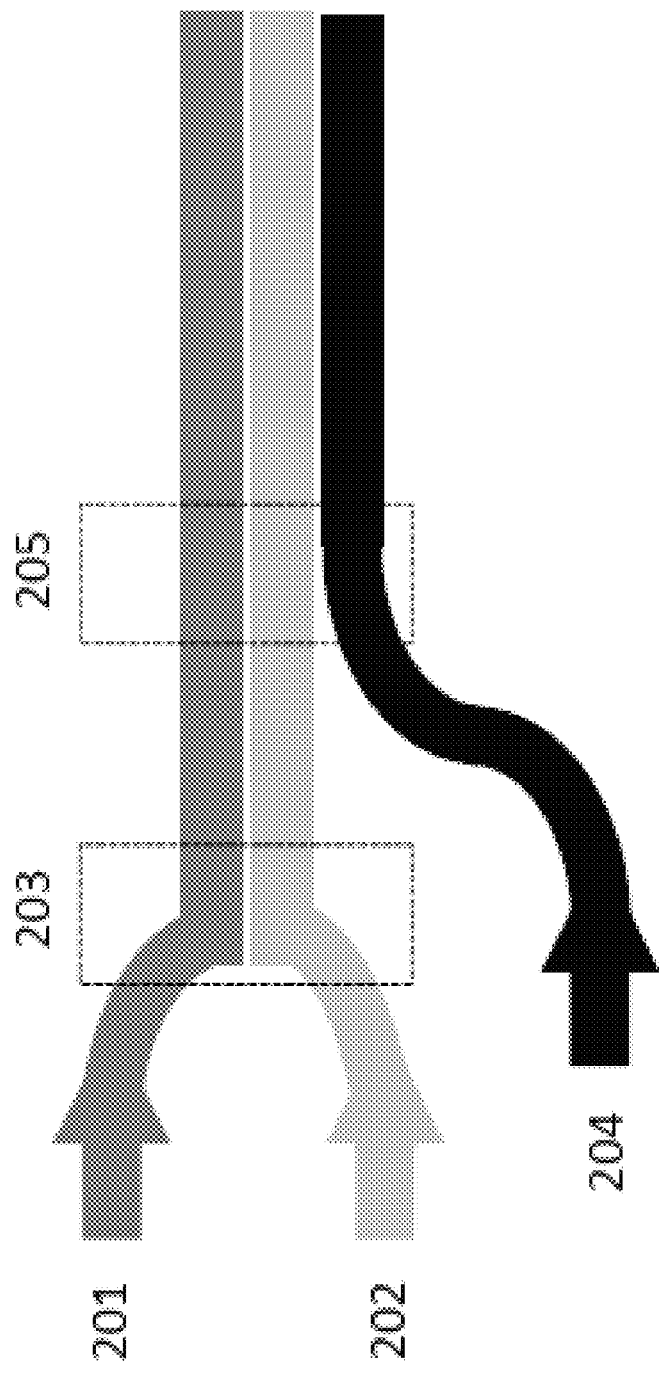
FIG. 5 shows an algorithmic computation of flows needed for forming the desired gradient.

As schematically represented in FIG. 5, two solvent streams [201 and 202] are mixed in a first mixing tee [203], followed by confluent addition of a third solvent stream [204] in a second mixing tee [205] before forming a collective output. This figure exemplifies mixing of solvents A and B prior to the disposable cartridge, and then addition of a dilutive solvent C after the cartridge. The two mixing points are then separated by a volume $V_{tt}$, where the relationship between the volume $V_{tt}$ and the functions for flows of A and B ($F_A$ and $F_B$) can be described by the following integral over time:

$$\int_{x=t_d}^{x=t}(F_A(x)+F_B(x))dx = V_{tt}$$

allowing us to determine a point in time, $t_d$, where the actual mixing of solvent A and B took place.

That is, if the flow of A and B is described by continuous or stepwise continuous functions and the volume $V_{tt}$ is known, we can solve the integral and solve for $t_d$ for any given time, t (symbolically or numerically). Knowing $t_d$ as a function of t allow us to calculate the composition of the solvent mix A/B entering the second mixing point (Mix-Tee2).

$$\text{Composition}_{ABMix2}(t) = \text{Composition}_{ABMix1}(td(t)) = \frac{F_B(td(t))}{F_A(td(t)) + F_B(td(t))}$$

Combined with a function for flow C, $F_C$, the composition leaving the second mixing point can be described:

$$\text{Composition}_{ABCMix2}(t) = \frac{\frac{F_B(td(t))}{F_A(td(t))+F_B(td(t))}(F_A(t)+F_B(t))}{F_A(t)+F_B(t)+F_C(t)}$$

Placing some simple restraints on the system allows us to find solutions to the above equations and generate the desired gradient (e.g. a linear gradient).

As a first solution:

The combined flow is at any t set to a constant: $F_{out}$, and $F_C$ is set to a first order polynomial: $F_C(t)=\alpha_C t+\beta_C$. This allow us to first find $t_d(t)$ by substituting $F_A$ $F_B$ with $F_{out}-F_C$:

$$\int_{t_d}^{t}(F_A(x)+F_B(x))dx=V_{tt}=\int_{t_d}^{t}(F_{out}-F_C(t))dx$$

The relevant solution if $\alpha_C \neq 0$ is:

$$t_d = \frac{-\sqrt{\alpha_c^2 t^2 + 2\alpha_c \beta_c t + 2\alpha_c F_{out} t + 2\alpha_c V tt + \beta_c^2 - 2\beta_c F_{out} + F_{out}^2} - \beta_c + F_{out}}{\alpha_c}$$

The composition can be simplified to:

$$\text{Composition}_{ABCMix2}(t) = C_o(t) = \frac{\frac{F_B(td(t))}{F_{out} - F_C(td(t))}(F_{out} - F_C(t))}{F_{out}}$$

By defining $F_{out}$, $V_{tt}$ and the C flow function (by defining the $\alpha_C$ and $\beta_C$), as well as the (linear) gradient, timetables for A, B and C may be found. The above equation solved for $F_B$ yields:

$$F_B(td(t)) = \frac{C_o(t) F_{out}(F_{out} - F_C(td(t)))}{(F_{out} - F_C(t))}$$

As $F_C(t)$ is defined, $F_A(td(t))$ is also known. $F_A(td(t))=F_{out}-F_C(td(t))-F_B(td(t))$. Timetables for the flows are thus found in the form of $\{F_A(td(t)), F_B(td(t)), F_C(td(t))\}$ E.g. a total flow of 10 uL/min and a composition of 4% B at time 0 will dictate flow-rates for A, B, C for an earlier $t_d$ (e.g. 50 seconds earlier depending on how C is defined), which is the first timepoint in the timetable of A, B and C.

REFERENCES

1. Knierman and Hale (WO2006104905 (A1))
2. Hoerning et al in 2007 (Hørning, O. B., Theodorsen, S., Vorm, O., & Jensen, O. N. (2007). Solid phase extraction-liquid chromatography (SPE-LC) interface for automated peptide separation and identification by tandem mass spectrometry. *International Journal of Mass Spectrometry*, 268(2), 147-157.)
3. Hoerning et al in 2008 (Hørning, O. B., Kjeldsen, F., Theodorsen, S., Vorm, O., & Jensen, O. N. (2008). Isocratic solid phase extraction-liquid chromatography (SPE-LC) interfaced to high-performance tandem mass spectrometry for rapid protein identification. *Journal of proteome research*, 7(8), 3159-3167.)
4. Falkenby et al. in 2014 (Falkenby, L. G., Such-Sanmartin, G., Larsen, M. R., Vorm, O., Bache, N., & Jensen, O. N. (2014). Integrated Solid-Phase Extraction—Capillary Liquid Chromatography (speLC) Interfaced to ESI—MS/MS for Fast Characterization and Quantification of Protein and Proteomes. *Journal of proteome research*, 13(12), 6169-6175.)
5. Binai, N. A., Marino, F., Soendergaard, P., Bache, N., Mohammed, S., & Heck, A. J. (2014). Rapid Analyses of Proteomes and Interactomes Using an Integrated Solid-Phase Extraction—Liquid Chromatography—MS/MS System. *Journal of proteome research*, 14(2), 977-985.
6. Iwata, Y. (US2004/0124128 A1)

The invention claimed is:

1. A system for separation of analytes in a liquid sample, said system comprising:
   a control unit for controlling and regulating flow rate and pressure of the system;
   an inlet for introducing the liquid sample into the system;
   a first column having a sorbent for trapping the analytes, said first column being configured to switch between a trapping mode and an elution mode, said trapping mode providing the inlet in fluid communication with the first column, and said elution mode providing elution of the analytes trapped in the first column to form eluted analytes;
   one or more holding loops configured to store one or more mobile phase gradients and the eluted analytes from the first column, the one or more holding loops each having a volume below 200 µL, an inner diameter of around 100 µm, and a length of at least 2 meters;
   one or more first fluid pumps connected in parallel and controlled by the control unit to establish a mobile phase comprising the one or more mobile phase gradients and deliver the mobile phase at a flow rate of 300 nL/min to 50 µL/min through said first column at a pressure of 1 bar to 50 bar, when the first column is in said elution mode;
   one or more second fluid pumps connected in parallel and controlled by the control unit to deliver a make-up flow rate, at a location between the first column and the one or more holding loops, of 300 nL/min to 50 µL/min at a pressure of 1 bar to 50 bar; wherein all of said one or more first fluid pumps and said one or more second fluid pumps are controlled by the control unit to establish said mobile phase gradient; and
   one or more valves constructed to switch between a low pressure position and a high pressure position, wherein said low pressure position establishes a fluid connection from the first column to the one or more holding loops, and said high pressure position establishes a fluid connection between a high pressure fluid pump and the one or more holding loops and a conduit leading to a chromatography column, wherein the control unit is adapted to activate the high pressure fluid pump and force the one or more mobile phase gradients and the eluted analytes in said one or more holding loops through the chromatography column at a flow rate of 20 nL/min to 20 µL/min and a pressure of 1 bar to 3,000 bar.

2. The system of claim 1 wherein the inner diameter of the first column is at least twice as large as the inner diameter of the chromatography column.

3. The system of claim 1, wherein the chromatography column contains C18 reversed phase material.

4. The system of claim 1, wherein the sorbent of the first column is selected from C18, C8, C4, hilic, SCX, SAX, cellulose, and antibodies.

5. A system for separation of analytes in a liquid sample, said system comprising:
   a control unit for controlling and regulating flow rate and pressure of the system;
   a disposable cartridge enclosing a sorbent for binding the analytes in the liquid sample;
   a recipient socket for receiving the disposable cartridge, wherein a mobile phase flows through the cartridge into the recipient socket, thereby eluting the analytes into the recipient socket to form eluted analytes;
   a first conduit in fluid communication with the recipient socket, said conduit establishing a fluid link to a holding loop, wherein the holding loop has a volume below 200 µL and a length of at least 2 meters and is configured to store one or more mobile phase gradients and the eluted analytes;
   one or more first fluid pumps connected in parallel and controlled by the control unit to optionally establish the one or more mobile phase gradients and to deliver a mobile phase at a flow rate of 300 nL/min to 50 µL/min through said cartridge at a pressure of 1 bar to 50 bar;
   one or more second fluid pumps connected in parallel and controlled by the control unit to optionally establish the one or more mobile phase gradients and to deliver a make-up flow rate, at a location between the recipient socket and a holding loop, of 300 nL/min to 50 µL/min at a pressure of 1 bar to 50 bar; and
   one or more valves constructed to switch between a low pressure position and a high pressure position, wherein said low pressure position establishes a fluid connection from the cartridge to the holding loop, and said high pressure position disconnects the fluid connection of the holding loop from the cartridge and establishes a fluid connection of the holding loop with a high pressure fluid pump and a second conduit leading to a chromatography column, wherein the control unit is adapted to activate the high pressure fluid pump and force the one or more mobile phase gradients and the eluted analytes in said loop through the chromatography column at a flow rate of 20 nL/min to 20 µL/min and a pressure of 1 bar to 3,000 bar.

6. The system of claim 5, wherein the inner diameter of the cartridge is at least twice as large as the inner diameter of the chromatography column.

7. The system of claim 5, wherein the cartridge is selected from:
   a. a pipette tip with chromatographic resin embedded and fixated therein;
   b. a length of tube, wherein its inner and/or outer surfaces may be cylindrical, conical, spherical or any combination thereof; and 8. The system of claim 5, wherein the chromatography column contains C18 reversed phase material.

9. The system of claim 5, wherein the sorbent of the cartridge is selected from C18, C8, C4, hilic, SCX, SAX, cellulose, and antibodies.

10. The system according to claim 1, wherein the control unit establishes the flow rate through the first column and the make-up flow rate each below 10 mL/min, and the flow rate through the chromatography column during separation is below 5 mL/min.

11. The system according to 10, wherein the control unit computes and establishes flow rates from each of the one or more first fluid pumps that are non-linear over time such that the one or more mobile phase gradients eluted from the holding loop are a piecewise linear mobile phase gradient.

12. The system of claim 1, wherein the control unit is adapted to establish a flow rate through the first column, and the make-up flow rate each above 50 μL/min and below 10 mL/min while the flow rate through the chromatography column during separation is below one fifth of the flow rate through the first column.

13. The system of claim 1, wherein the control unit is adapted to establish flows from the one or more first fluid pumps in the range of less than 10 μL/min at a pressure of 1 bar to 50 bar.

14. The system of claim 1, wherein the control unit is adapted to establish flows from the one or more first fluid pumps in the range of less than 5 μL/min at a pressure of 1 bar to 50 bar.

15. The system of claim 1, wherein the control unit is adapted to establish flows from the one or more first fluid pumps in the range of less than 2 μL/min at a pressure of 1 bar to 50 bar.

16. The system of claim 1, wherein the length is up to 7 meters.

17. The system of claim 5, wherein the length is up to 7 meters.

18. A system for separation of analytes in a liquid sample, said system comprising:
   a control unit for controlling and regulating flow rate and pressure of the system;
   an inlet for introducing the liquid sample into the system;
   a first column having a sorbent for trapping the analytes, said first column being configured to switch between a trapping mode and an elution mode, said trapping mode providing the inlet in fluid communication with the first column, and said elution mode providing elution of the analytes trapped in the first column to form eluted analytes;
   one or more holding loops configured to store one or more mobile phase gradients and the eluted analytes from the first column, the one or more holding loops each having a volume below 200 μL and a length of several meters;
   one or more first fluid pumps connected in parallel and controlled by the control unit to establish a mobile phase comprising the one or more mobile phase gradients and deliver the mobile phase at a flow rate of 300 nL/min to 50 μL/min through said first column at a pressure of 1 bar to 50 bar, when the first column is in said elution mode;
   one or more second fluid pumps connected in parallel and controlled by the control unit to deliver a make-up flow rate, at a location between the first column and the one or more holding loops, of 300 nL/min to 50 μL/min at a pressure of 1 bar to 50 bar; wherein all of said one or more first fluid pumps and said one or more second fluid pumps are controlled by the control unit to establish said mobile phase gradient; and
   one or more valves constructed to switch between a low pressure position and a high pressure position, wherein said low pressure position establishes a fluid connection from the first column to the one or more holding loops, and said high pressure position establishes a fluid connection between a high pressure fluid pump and the one or more holding loops and a conduit leading to a chromatography column, wherein the control unit is adapted to activate the high pressure fluid pump and force the one or more mobile phase gradients and the eluted analytes in said one or more holding loops through the chromatography column at a flow rate of 20 nL/min to 20 μL/min and a pressure of 1 bar to 3,000 bar.

19. The system of claim 18, wherein the length is up to 7 meters.

20. The system of claim 18, wherein the one or more holding loops each have an inner diameter of around 100 μm.

* * * * *